(12) United States Patent
Lam et al.

(10) Patent No.: US 9,073,278 B2
(45) Date of Patent: Jul. 7, 2015

(54) GEODESIC PNEUMATIC TIRE WITH BRAIDED CARCASS

(75) Inventors: Hoa L. Lam, Springfield, PA (US); Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 665 days.

(21) Appl. No.: 13/283,188

(22) Filed: Oct. 27, 2011

(65) Prior Publication Data

US 2013/0105057 A1    May 2, 2013

(51) Int. Cl.
| | |
|---|---|
| *B60C 9/11* | (2006.01) |
| *B29D 30/16* | (2006.01) |
| *B60C 9/06* | (2006.01) |
| *B29D 30/08* | (2006.01) |

(52) U.S. Cl.
CPC ............ *B29D 30/1657* (2013.01); *B60C 9/11* (2013.01); *B29D 2030/082* (2013.01); *B60C 9/06* (2013.01)

(58) Field of Classification Search
None
See application file for complete search history.

(56) References Cited

U.S. PATENT DOCUMENTS

| | | | |
|---|---|---|---|
| 2,700,998 A | 2/1955 | Wallace | |
| 2,906,314 A | 9/1959 | Henry | |
| 3,770,041 A | 11/1973 | Abbott | |
| 3,780,783 A | 12/1973 | Curtiss, Jr. | |
| 4,668,318 A | 5/1987 | Piccoli et al. | |
| 6,068,721 A | 5/2000 | Dyer et al. | |
| 6,113,833 A | 9/2000 | Ogawa | |
| 6,386,258 B1 | 5/2002 | Dyer et al. | |
| 6,857,452 B2 | 2/2005 | Quigley et al. | |
| 7,017,616 B2 | 3/2006 | Ono et al. | |
| 7,572,745 B2 | 8/2009 | Branch et al. | |
| 2004/0060633 A1 | 4/2004 | Panning | |
| 2005/0028919 A1 | 2/2005 | Panning | |
| 2006/0162848 A1 | 7/2006 | Weissert et al. | |
| 2010/0000661 A1 | 1/2010 | Ogawa | |
| 2011/0146871 A1* | 6/2011 | Laske et al. | 152/517 |
| 2011/0146874 A1* | 6/2011 | Losey et al. | 152/526 |
| 2011/0146875 A1* | 6/2011 | Losey et al. | 152/526 |
| 2011/0146876 A1* | 6/2011 | Landers et al. | 152/538 |

FOREIGN PATENT DOCUMENTS

| | | | |
|---|---|---|---|
| GB | 190916830 | * | 1/1910 |
| GB | 820825 A | | 9/1959 |
| GB | 848962 A | | 9/1960 |
| JP | 05139113 | | 6/1993 |
| WO | WO 98/54007 | * | 12/1998 |

OTHER PUBLICATIONS

European Patent Office, Search Report issued in European application No. 12190254.8 dated Feb. 1, 2013.

* cited by examiner

*Primary Examiner* — Justin Fischer
(74) *Attorney, Agent, or Firm* — Wood, Herron & Evans, LLP

(57) ABSTRACT

A pneumatic tire includes a carcass with a plurality of ply cords braided into an interlaced structure. Each of the ply cords follows a geodesic path from a first sidewall portion across a crown portion to a second sidewall portion. The pneumatic tire also includes a rubber layer encasing the carcass and including a tread adjacent the crown portion. The pneumatic tire does not include any beads because the plurality of carcass plies is folded onto itself at each of the first and second sidewall portions. Thus, the benefits of geodesic plies and braided ply construction are achieved by the pneumatic tire.

20 Claims, 7 Drawing Sheets

GEODESIC PNEUMATIC TIRE WITH BRAIDED CARCASS

BACKGROUND

The present invention relates to pneumatic tires used on passenger vehicles, and particularly to geodesic tires having carcass plies following geodesic paths.

In conventional pneumatic tires for passenger vehicles, the main internal structure or carcass of the tires includes a pair of beads and a plurality of plies wrapped from the first bead to the second bead to define a generally U-shaped cross-section. The plies are rubber-coated fabric cords composed of materials such as polyester. The plies are typically wrapped to extend either generally perpendicular to the pair of beads or angled to the pair of beads (referred to as a "bias" construction). The plies define the primary structural component of a pneumatic tire and transfer forces from a tread of the tire to the beads and therefore the rims of the tire. Ply construction is well known in the art and is generally successful for its intended purpose, which is to maintain the size and shape of the tire and transfer loads applied to the tire.

Geodesic Tires are those tires whose ply cord paths are geodesic lines on the tire surface. More specifically, a geodesic tire includes angled ply cords that have a small angle of inclination from a tangential direction near the beads and a larger angle of inclination at the crown portion of the tire. This ply cord path leads to improved durability and an improved or soft ride. The field of ply winding machines has advanced to a point that pneumatic tires having substantially geodesic plies can be generated using sophisticated computerized controls of the ply winding machine. However, the operation of these machines is highly complex and time consuming, which significantly increases the expense of manufacturing truly geodesic tires. There is a need, therefore, for an improved pneumatic tire that addresses these and other issues associated with conventional tires.

SUMMARY

According to one aspect of the invention, a pneumatic tire includes a carcass with a plurality of ply cords braided into an interlaced structure. The carcass includes a crown portion, a first sidewall portion, and a second sidewall portion connected to the first sidewall portion by the crown portion. Each of the ply cords follows a geodesic path from the first sidewall portion to the second sidewall portion. The pneumatic tire also includes a rubber layer surrounding the carcass. The rubber layer includes a first tire sidewall encasing the first sidewall portion of the carcass, a second tire sidewall encasing the second sidewall portion of the carcass, and a tire crown encasing the crown portion of the carcass and including a tread. Thus, the pneumatic tire includes advantageous strength provided by the interlaced structure of the carcass while also providing the additional benefits of geodesic plies.

The ply cords may be braided into a regular (2×2) braid pattern or a diamond (1×1) braid pattern. In one embodiment, the plurality of ply cords includes at least 144 ply cords braided into the interlaced structure. Each of the ply cords defines an angle from a tangential direction that ranges from nearly 0 degrees at the first and second sidewall portions to about 48 degrees at the crown portion. Each of the plurality of ply cords crimps partially around each other intersecting ply cord in the interlaced structure.

In another aspect of the invention, a method of forming a pneumatic tire includes braiding a plurality of ply cords into an interlaced structure using a braiding machine. The method also includes moving a mandrel axially relative to the braiding machine. While the mandrel is moved relative to the braiding machine, the braided ply cords are applied onto the mandrel to form a carcass including a crown portion, a first sidewall portion, and a second sidewall portion connected with the first sidewall portion by the crown portion. The method also includes varying a movement speed of the mandrel and the braiding machine rotational speed such that each of the braided ply cords follows a geodesic path from the first sidewall portion to the second sidewall portion.

In one embodiment, applying the braided ply cords to the mandrel further includes adhering first ends of the plurality of ply cords into position at the crown portion and moving the mandrel axially relative to the braiding machine in a first direction so as to form a portion of the first sidewall portion of the carcass. The axial movement of the mandrel is then reversed to a second direction to cause the plurality of ply cords to fold onto itself at the first sidewall portion. A first fixture is moved into engagement with the mandrel at the first sidewall portion to clamp the plurality of ply cords into position at the first sidewall portion. The axial movement of the mandrel continues along the second direction to form a portion of the first sidewall portion, a portion of the crown portion, and a portion of the second sidewall portion.

The axial movement of the mandrel is then reversed to the first direction to cause the plurality of ply cords to fold onto itself at the second sidewall portion. A second fixture is moved into engagement with the mandrel at the second sidewall portion to clamp the plurality of ply cords into position at the second sidewall portion. The axial movement of the mandrel continues along the first direction to form a portion of the second sidewall portion and a portion of the crown portion. The second ends of the plurality of ply cords are then adhered into position at the crown portion to complete the generation of the carcass.

In one aspect, the braiding machine includes a track plate with a first inner plate portion and a second outer plate portion, a plurality of carriers receiving supplies of ply cord material on the track plate, and a fixed braiding guide ring to conform the braided cords onto the mandrel. Braiding the plurality of ply cords into an interlaced structure includes moving the mandrel with respect to the track plate to draw the plurality of ply cords from the plurality of carriers. The first outer plate portion and the second inner plate portion are rotated relative to one another in opposing directions to interlace the plurality of ply cords as the plurality of ply cords travels from the track plate to the braiding guide ring. The rotational speed of the first outer plate portion and the second inner plate portion is adjusted independently from an adjustment of the axial velocity of the mandrel so that the angle of the ply cords applied to the mandrel changes. In this regard, the braiding machine is operable to produce ply cords having a truly geodesic path on the mandrel.

These and other objects and advantages of the present invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DEFINITIONS

Figure 1:
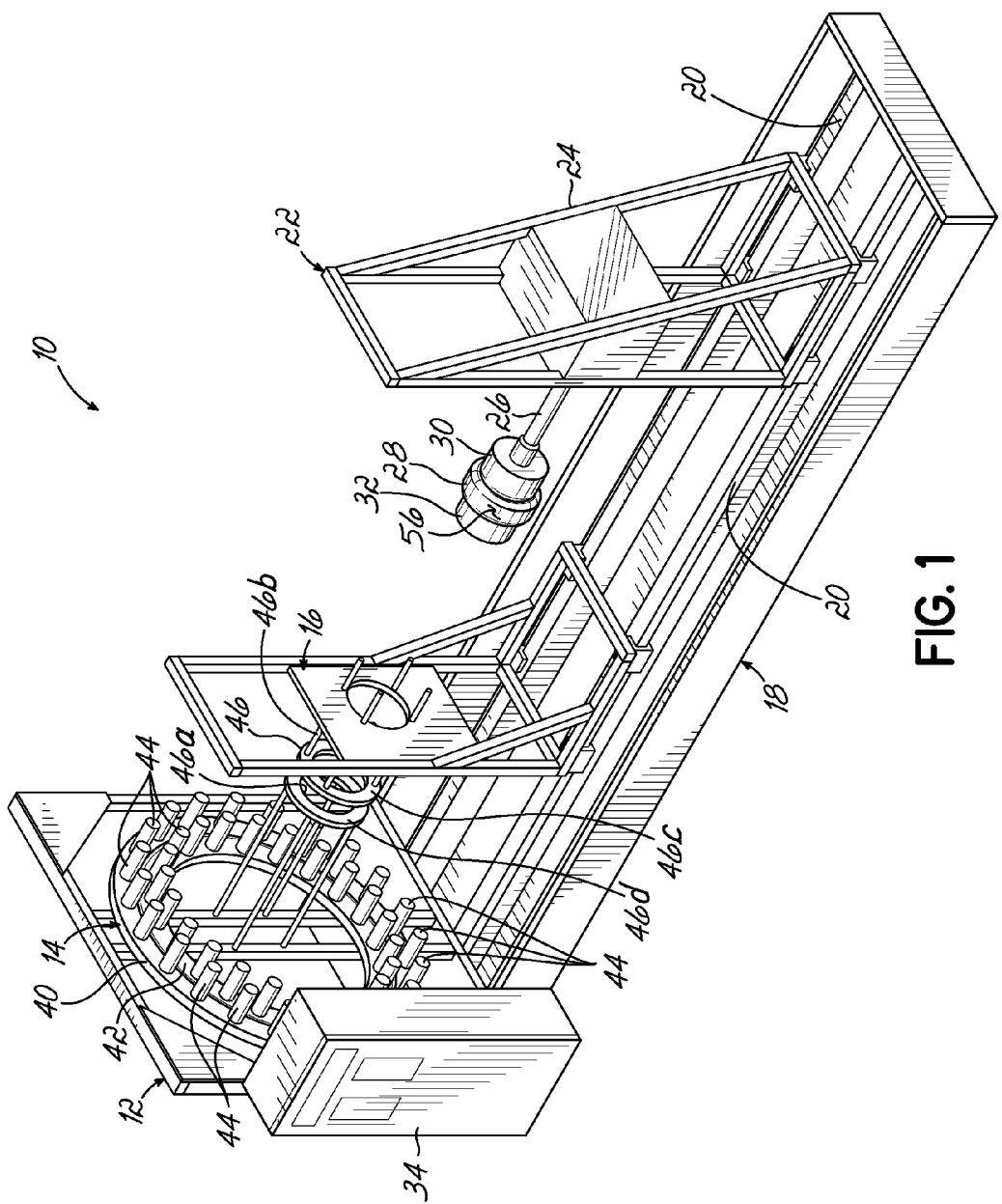
FIG. 1 is a perspective view of a tire making machine including a mandrel and a braiding machine for applying braided geodesic plies to the mandrel in accordance with one embodiment of the current invention.

"Air Chamber" means an annular pneumatic chamber defined between a tire and the rim when the tire is installed on the rim.

"Axial" means lines or directions that are parallel to the axis of rotation of the tire.

"Bead" means a circumferentially substantially inextensible metal wire assembly that forms the core of the bead area, and is associated with holding the tire to the rim.

"Belt" means a reinforcing layer, generally formed from rubber, and positioned at the crown portion of a tire.

"Braiding" means to form an interlaced or overlapping structure from a plurality of ply cords.

"Braiding Guide Ring" means a fixed member configured to conform the braided ply cords onto a mandrel.

"Carcass" means the tire structure apart from the belt structure, tread, undertread, and sidewall rubber over the plies.

"Carrier" means a rotatable element on a braiding machine configured to carry a bobbin or reel of ply cord material.

"Crown" or "Crown Portion" means the generally planar section of a pneumatic tire located at a farthest radial distance from the axis of rotation of the tire.

"End Seam" means a seam formed by multiple ends of a plurality of ply cords in a tire carcass.

"Equatorial Plane" (EP) means the plane perpendicular to the tire's axis of rotation and passing through the center of its tread.

"Fixture" means a solid member located adjacent to a mandrel for selectively fixing tire components onto the mandrel.

"Geodesic" means the path defined by the shortest path across a curved surface as defined by the mathematical equation $\rho \cos \alpha =$ a constant.

"Inner" means toward the inside of the tire.

"Inner Liner" means a molded rubber layer covering the inner side of the carcass and facing the air chamber when the tire is assembled.

"Mandrel" means a solid member upon which tire components are assembled.

"Outer" means toward the exterior of the tire.

"Ply cord" means a calendared thread formed from fabric or another suitable material and coated with rubber and wound or braided to form the carcass of a tire.

"Pneumatic Tire" means a laminated mechanical device of generally toroidal shape, usually an open torus, having a tread and made of rubber, chemicals, fabric, and steel or other materials. When mounted on the wheel of a motor vehicle, the tire through its tread provides traction and contains the fluid that sustains the vehicle load.

"Radial" means lines or directions toward or away from the axis of rotation of the tire in the equatorial plane or in a plane parallel to the equatorial plane.

"Rivet Area" means a space between adjacent plies in a conventional carcass.

"Rubber Layer" means the tire structure apart from the belt structure and the carcass.

"Sidewall" means that portion of a tire between the crown portion and the location where the tire abuts the rim of a wheel.

"Tangential" means lines or directions extending perpendicular to the radial direction and tangent to the perimeter of the surface of the annular tread.

"Track Plate" means the main element of a braiding machine that includes carriers and horn gears for driving rotational movement of bobbins or reels of ply cord material on the carriers.

"Tread" means a molded rubber component which includes the portion of the tire that comes into contact with the road when the tire is normally inflated and under normal load.

DETAILED DESCRIPTION

Referring to FIG. 1, a tire making machine 10 according to one embodiment of the current invention is a maypole-type braiding machine. The tire making machine 10 includes a braiding machine 12 having a track plate 14 and a fixed braiding guide ring assembly 16 attached to a floor traverse 18. More particularly, the floor traverse 18 includes a pair of rails 20 upon which the braiding guide ring assembly 16 is mounted. The tire making machine 10 also includes a mandrel assembly 22 including a mandrel support 24 movably coupled to the floor traverse 18. The mandrel support 24 includes a support rod 26 extending along an axial direction. The mandrel assembly 22 also includes a mandrel 28, a first fixture 30 adjacent the mandrel 28, and a second fixture 32 adjacent the mandrel 28, each supported on the support rod 26.

The tire making machine 10 also includes an electronic control unit 34 for controlling known drive motors or mechanisms (not shown) that actuate rotation of the track plate 14, axial movement of the mandrel support 24, and movement of the fixtures 30, 32 with respect to the mandrel 28. In one non-limiting example, the rotation of the carriers 44 and the axial movement of the mandrel support 24 are actuated by electric motors with variable velocity controlled by the electronic control unit 34. To this end, the electronic control unit 34 operates the components of the tire making machine 10 to produce a braided geodesic carcass of plies, described in further detail with reference to FIGS. 5-8 below.

With continued reference to FIG. 1, the track plate 14 of the braiding machine 12 is divided into an outer plate portion 40 and an inner plate portion 42 surrounded in a radial direction by the outer plate portion 40. Each of the outer plate portion 40 and the inner plate portion 42 includes a plurality of carriers 44 configured to receive spools or bobbins of ply cord material (not shown in FIG. 1). For a full-size passenger tire or truck tire, the total number of carriers 44 on the track plate 14 is at least 144 carriers (e.g., 144 carriers with 72 on each of the outer plate portion 40 and the inner plate portion 42; 196 carriers; 288 carriers; etc.). The total number of carriers 44 used also depends on the tape width of ply cord material used to form the geodesic carcass. For example, the ply cords may be formed from conventional rubber-coated fabric so as to have a tape width of 0.40 inches and a tape thickness of 0.05 inches. If a smaller dimensioned ply were to be used to form the carcass, then additional carriers 44 would be necessary on a larger track plate 40 to completely cover the mandrel 28 during the braiding process. The carriers 44 are sized to receive bobbins that contain enough ply cord material for up to 20 to 25 full tire carcasses. In this regard, the carriers 44 are configured to reduce the downtime necessary during the production of multiple pneumatic tires to reload every carrier 44 with a new bobbin of ply cord material.

The carriers 44 on the outer plate portion 40 and the carriers 44 inner plate portion 42 are driven to rotate in opposite directions at a shared rotational speed, but the shared rotational speed of both plate portions 40, 42 may be modified by the electronic control unit 34 as described in detail below. The track plate 14 remains stationary along the axial direction while the mandrel 28 moves in the axial direction, thereby drawing ply cord material from the carriers 44 on the track plate 14. It will be understood that the opposing rotational movements of the carriers 44 on the outer plate portion 40 and the inner plate portion 42 causes ply cords to braid together into an interlaced structure as the plies travel towards a braiding guide ring 46 of the braiding machine 12. The carriers 44 and the braiding guide ring 46 are each configured to prevent undesired twisting of the ply cords during application of the ply cords to the mandrel 28. The braiding guide ring 46 includes first and second rings 46c, 46d that define a central aperture 46a for the braided ply cords to pass through and are supported on the braiding guide ring assembly 16 by respective ring supports 46b as shown in FIG. 1. The central aperture 46a is also sized to receive the mandrel 28 and apply the braided plurality of ply cords so as to conform onto the mandrel 28. The ply cords are slightly tensioned during passage through the central aperture 46a such that each ply cords crimps partially around each other intersecting ply cord in the interlaced structure formed by the braiding machine 12. It will be understood that the ply cords may be guided by the first ring 46c when the mandrel 28 is moving in a first direction and guided by the second ring 46d when the mandrel 28 is moving in a second direction opposite the first direction. The interlaced structure improves the mechanical properties of the tire carcass formed on the mandrel 28.

As discussed above, the electronic control unit 34 is operable to modify the rotational speeds of the carriers 44 on the outer plate portion 40 and the carriers 44 on the inner plate portion 42 and the axial velocity of the mandrel 28. To this end, the electronic control unit 34 modifies the angle of the ply cords applied to the mandrel 28 with respect to the tangential direction defined at the mandrel 28 by changing the rotational speed of the carriers 44 on the plate portions 40, 42 and/or the axial speed of the mandrel 28. In one example, ply cord orientations ranging from about 10 degrees to about 80 degrees from a tangential direction are possible by controlling the relative speeds of the carriers 44 on plate portions 40, 42 and the mandrel 28. The path of ply cords applied to the mandrel 28 approaches the tangential direction as the axial velocity of the mandrel 28 slows to nearly zero. As a result, a ply cord path resembling a true geodesic path (defined by the mathematical equation $\rho \cos \alpha = a$ constant) across the mandrel 28 is defined by each ply cord in the interlaced structure. More particularly, the angle of the ply cord approaches zero (i.e., tangent) at the sidewalls of a tire carcass and is about 48 degrees at the crown portion of a tire carcass. The geodesic ply path is further described with reference to FIGS. 5 and 6 below. It will be understood that the electronic control unit 34 may be a computerized control in other embodiments consistent with the scope of the invention.

Figure 2:
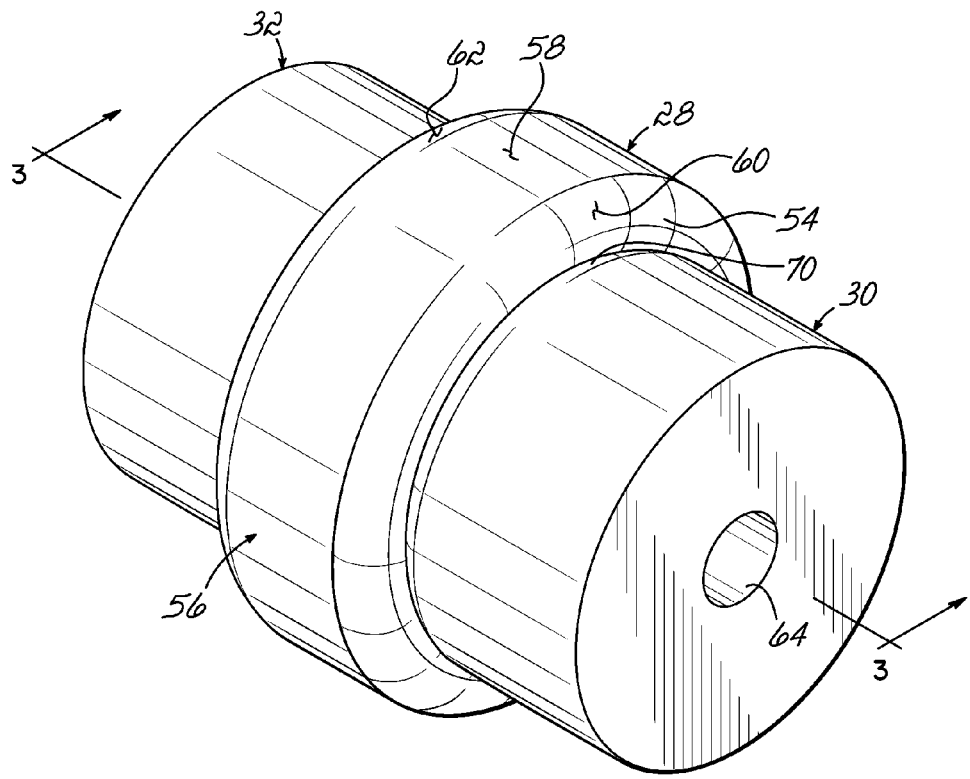
FIG. 2 is a perspective view of the mandrel of FIG. 1 including two fixtures movable relative to the mandrel.
Figure 3:
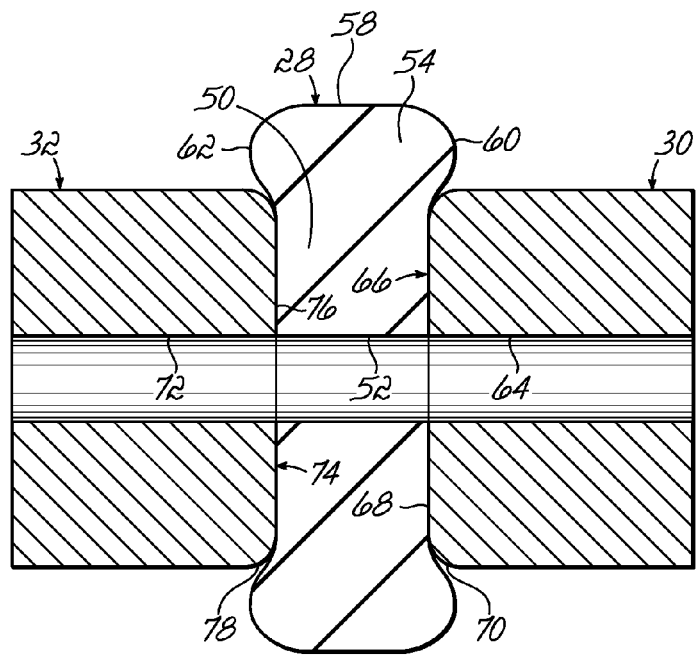
FIG. 3 is a cross-sectional side view of the mandrel and fixtures of FIG. 2.

The mandrel 28 and fixtures 30, 32 of the mandrel assembly 22 are shown in further detail in FIGS. 2 and 3, with the support rod 26 of the mandrel support 24 removed for clarity. The mandrel 28 includes an inner cylindrical portion 50 including a central bore 52 for receiving the support rod 26. The mandrel 28 also includes an outer toroidal portion 54 defining a tire building surface 56 on which the various components of the pneumatic geodesic tire are assembled. The tire building surface 56 is shaped to approximate the final toroidal shape of the pneumatic tire, as shown in the exemplary embodiment discussed with reference to FIGS. 7 and 8 below. To this end, the tire building surface 56 includes a substantially planar crown surface 58 sandwiched between a first sidewall surface 60 and a second sidewall surface 62. The first and second sidewall surfaces 60, 62 are rounded so as to bow outwardly in an axial direction from the crown surface 58 and then inwardly in the axial direction adjacent the inner cylindrical portion 50. Thus, the mandrel 28 provides the form or shape of the carcass formed from the braided ply cords.

The first fixture 30 defines a generally cylindrical shape that is slightly larger in radial dimension than the inner cylindrical portion 50 of the mandrel 28. In this regard, the first fixture 30 includes a central bore 64 for receiving the support rod 26 and a first clamping surface 66 facing towards the mandrel 28. The first clamping surface 66 includes a planar surface portion 68 configured to abut the inner cylindrical portion 50 of the mandrel 28 and a curved corner portion 70 configured to abut a portion of the first sidewall surface 60 of the mandrel 28. The first fixture 30 is adapted to move from a first position (not shown) slightly spaced from the mandrel 28 to a second position (shown in FIGS. 2 and 3) in which the first fixture 30 abuts the mandrel 28. Thus, the first fixture 30 is operable to clamp any ply cords into position on the first sidewall surface 60 during the formation of a carcass as described in further detail below.

Similarly, the second fixture 32 also defines a generally cylindrical shape that is slightly larger in radial dimension than the inner cylindrical portion 50 of the mandrel 28. In this regard, the second fixture 32 includes a central bore 72 for receiving the support rod 26 and a second clamping surface 74 facing towards the mandrel 28. The second clamping surface 74 includes a planar surface portion 76 configured to abut the inner cylindrical portion 50 of the mandrel 28 and a curved corner portion 78 configured to abut a portion of the second sidewall surface 62 of the mandrel 28. The second fixture 32 is adapted to move from a first position (not shown) slightly spaced from the mandrel 28 to a second position (shown in FIGS. 2 and 3) in which the second fixture 32 abuts the mandrel 28. Thus, the second fixture 32 is operable to clamp any ply cords into position on the second sidewall surface 62 during the formation of a carcass.

An exemplary method of building a pneumatic tire 80 and particularly a braided geodesic tire carcass 82 is now described with reference to FIGS. 4A-8. Before beginning the application of the braided carcass 82, an inner liner 84 of the pneumatic tire 80 is positioned onto the tire building surface 56 of the mandrel 28 to define the innermost radial layer of the finished tire 80. The desired number of ply cord bobbins (not shown) is then loaded onto the carriers 44 of the track plate 14. The mandrel 28 is then ready to receive the braided plurality of ply cords forming the carcass 82. For the sake of illustrative simplicity, FIGS. 4A-4D only illustrate one exemplary carcass ply cord 86 as it is applied to the mandrel 28 during the formation of the carcass 82 described below.

Figure 4A:
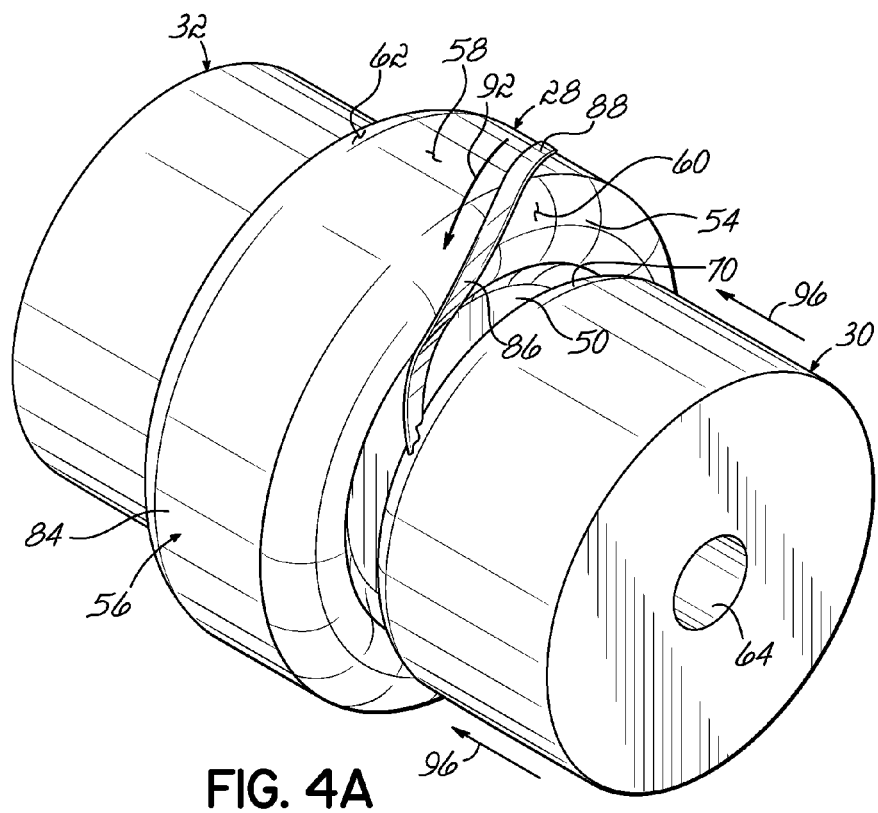
FIG. 4A is a front perspective view of the mandrel and fixtures of FIG. 2 during a first pass of the braiding machine, showing one exemplary cord ply being applied to the mandrel.
Figure 4B:
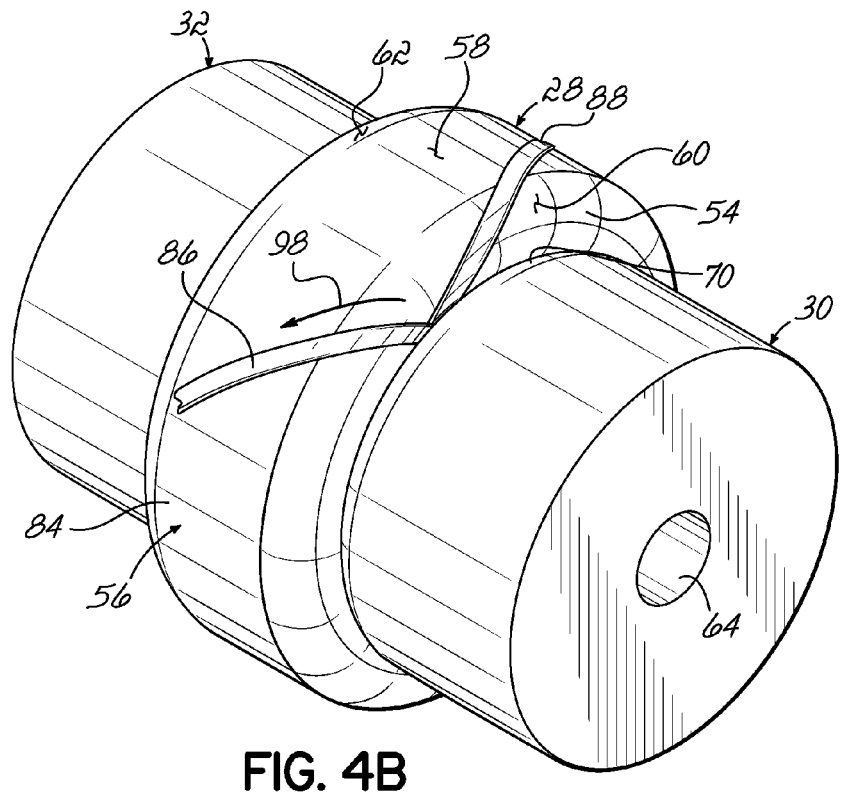
FIG. 4B is a front perspective view of the mandrel and fixtures of FIG. 4A during a second pass of the braiding machine.
Figure 4C:
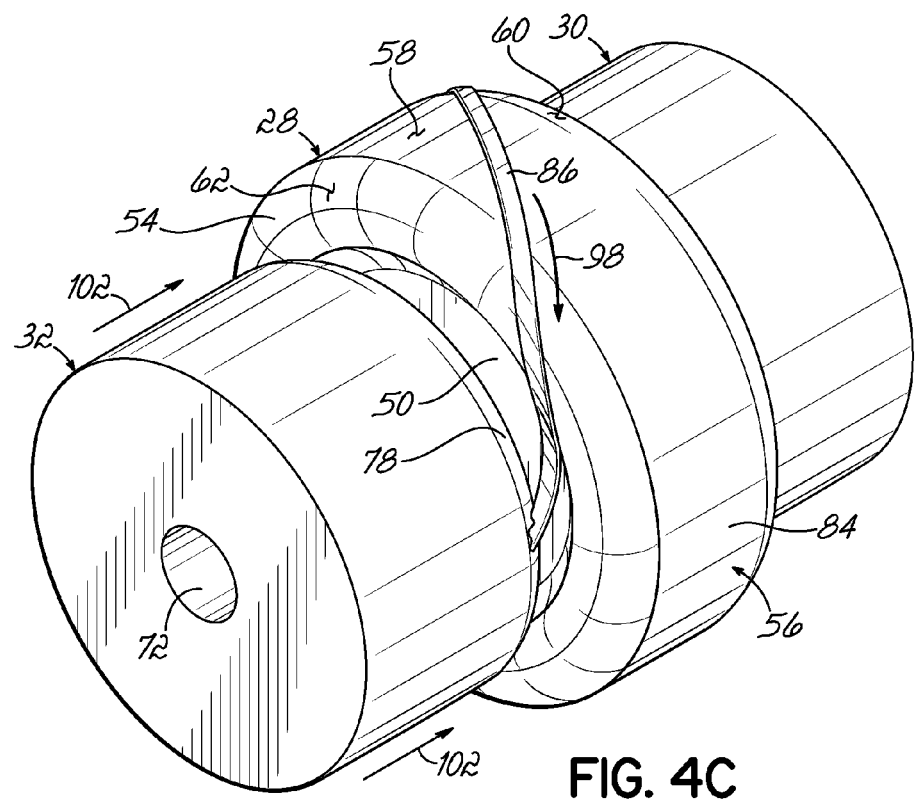
FIG. 4C is a rear perspective view of the mandrel and fixtures of FIG. 4B during the second pass of the braiding machine.

As shown in FIG. 4A, a first end 88 of each carcass ply cord 86 is adhered to the inner liner 84 near the center of a crown portion 90 of the carcass 82. As the braiding machine 12 braids the plurality of ply cords 86 into an interlaced structure, the mandrel 28 is moved axially through the center of the braiding machine 12 at the braiding guide ring 46 in a first direction to apply the interlaced or braided structure onto the inner liner 84 at the mandrel 28. The path of the exemplary ply cord 86 during this first pass follows a substantially geodesic path as shown in FIG. 4A by arrow 92. To this end, the ply cord 86 transitions from being highly angled (e.g., 48 degrees) from the tangential direction at the first end 88, to nearly tangential (e.g., 0 degrees) at the junction of the first sidewall surface 60 and the inner cylindrical portion 50 of the mandrel 28. The ply cords 86 are applied in this manner by varying the axial movement speed of the mandrel 28. As a result, the plurality of ply cords 86 produces a first pass or layer of ply material that defines a portion of the crown portion 90 of the carcass 82 as well as a portion of a first sidewall portion 94 of the carcass 82.

Once the braided ply cords 86 reach the junction of the first sidewall surface 60 and the inner cylindrical portion 50 of the mandrel 28, the movement direction of the mandrel 28 is reversed to a second direction opposite the first direction. This reversal of axial movement direction causes each of the ply cords 86 in the braided carcass 82 to fold over upon itself at the junction of the first sidewall surface 60 and the inner cylindrical portion 50 of the mandrel 28. In order to prevent the folded ply cords 86 from pulling off of the tire building surface 56, the first fixture 30 is moved as shown by arrows 96 in FIG. 4A into abutting engagement with the mandrel 28, thereby clamping the folded ply cords 86 between the curved corner portion 70 of the first clamping surface 66 and the first sidewall surface 60 of the mandrel 28. The mandrel 28 then continues to move axially in the second direction through the center of the braiding machine 12 and braiding guide ring 46 to form a second pass of ply cords 86 as shown by arrows 98 in FIGS. 4B and 4C. As a result, the plurality of ply cords 86 produces a second pass or layer of ply material that forms portions of the first sidewall portion 94 of the carcass 82, the crown portion 90 of the carcass 92, and a second sidewall portion 100 of the carcass 82.

Once the braided ply cords 86 reach the junction of the second sidewall surface 62 and the inner cylindrical portion 50 of the mandrel 28, the movement direction of the mandrel 28 is once again reversed to the first direction. This reversal of axial movement direction causes each of the ply cords 86 in the braided carcass 82 to fold over upon itself at the junction of the second sidewall surface 62 and the inner cylindrical portion 50 of the mandrel 28. In order to prevent the folded ply cords 86 from pulling off of the tire building surface 56, the second fixture 32 is moved as shown by arrows 102 in FIG. 4C into abutting engagement with the mandrel 28, thereby clamping the folded ply cords 86 between the curved corner portion 78 of the second clamping surface 74 and the second sidewall surface 62 of the mandrel 28. The mandrel 28 then continues to move axially in the first direction through the center of the braiding machine 12 and braiding guide ring 46 to form a third pass of ply cords 86 as shown by arrow 104 in FIGS. 4B and 4C. As a result, the plurality of ply cords 86 produces a third pass or layer of ply material that forms portions of the second sidewall portion 100 of the carcass 82 and the crown portion 90 of the carcass 92.

Figure 4D:
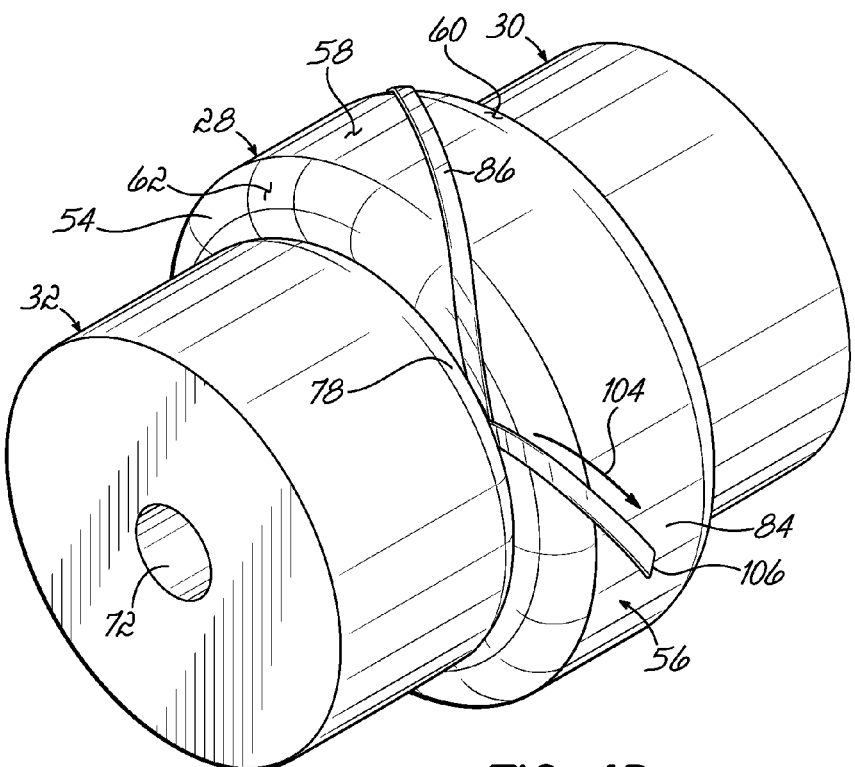
FIG. 4D is a rear perspective view of the mandrel and fixtures of FIG. 4C during a third pass of the braiding machine.

As shown in FIG. 4D, each of the plurality of ply cords 86 is cut at second ends 106 located near the center of the crown portion 90 of the carcass 82. These second ends 106 are adhered in position to the remainder of the carcass 82 at the crown portion 90, thereby completing the tire carcass 82. The mandrel 28 may then be removed from the mandrel support 24 with the inner liner 84 and carcass 82 in position and moved to another station for further assembly described in further detail below. It will be understood that the application of braided ply cords 86 could continue through more passes or layers if that is desired in the particular pneumatic tire 80. In these alternative embodiments, the location of where the ply cords 86 fold onto themselves at each sidewall portion 94, 100 may be indexed for each pass of the ply cords 86. In any event, the fabric material within the ply cords 86 does not directly engage fabric material of adjacent ply cords 86 at the fold over because the rubber layer surrounding the fabric material precludes this fabric-to-fabric contact from occurring.

Figure 5:
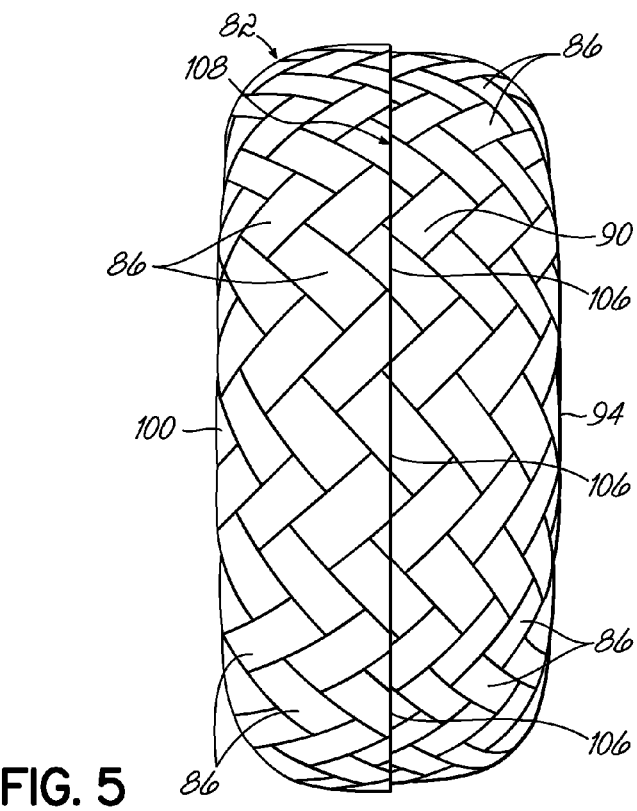
FIG. 5 is a front view of the carcass of a tire formed by the tire building machine of FIG. 1 with a regular (2×2) braid.
Figure 6:
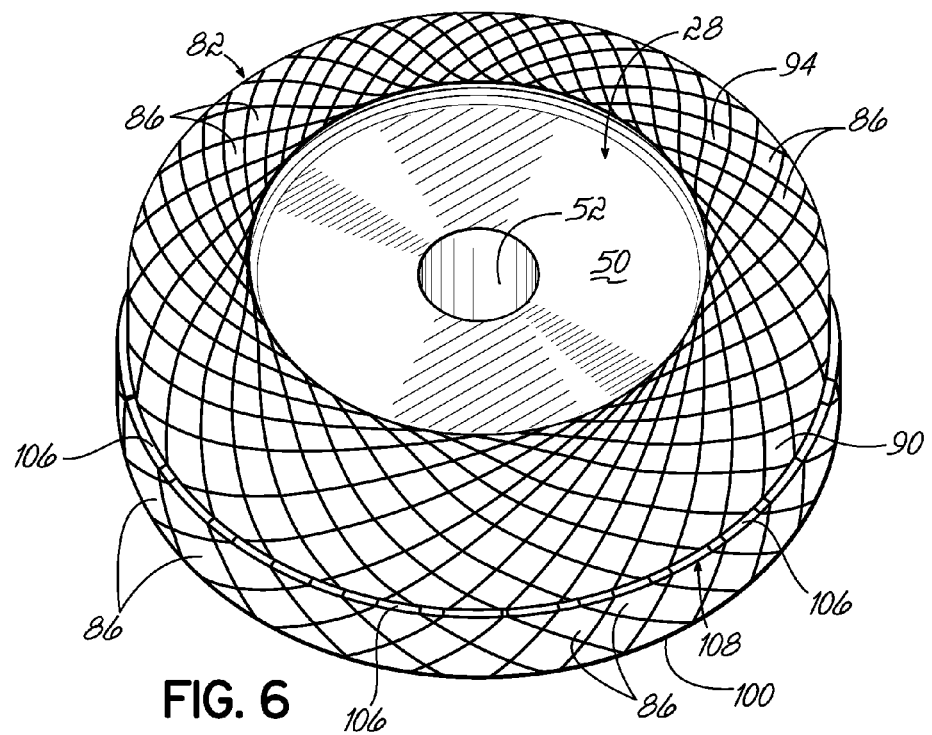
FIG. 6 is a perspective view of the carcass of a tire formed by the tire building machine of FIG. 1 with a diamond (1×1) braid.

Two potential embodiments of the tire carcass 82 after removal from the mandrel support 24 are illustrated in FIGS. 5 and 6. In the first embodiment shown in FIG. 5, the plurality of ply cords 86 is braided into a regular (2×2) braid pattern. In other words, each ply cord 86 passes over two adjacent ply cords 86, then under two adjacent ply cords 86, and so on. In the second embodiment shown in FIG. 6, the plurality of ply cords 86 is braided into a diamond (1×1) braid pattern. To this end, each ply cord 86 passes over one adjacent ply cord 86, then under one adjacent ply cord 86, and so on. The diamond braid pattern may be formed by only loading half the number of available carriers 44 on the track plate 14 with a bobbin of ply cord material, while the regular braid pattern may be formed by loading all of the carriers 44 on the track plate 14 with a bobbin of ply cord material. As shown in each of FIGS. 5 and 6, the braided plurality of ply cords 86 in each embodiment substantially covers the entire tire building surface of the mandrel 28 because none of the mandrel is visible along the crown portion 90 and the sidewall portions 94, 100 of the carcass 82.

In each embodiment of the tire carcass 82, the starting and ending locations of the carcass 82 may be modified by changing the location on the mandrel 28 at which the first ends 88 and/or the second ends 106 of the ply cords 86 are adhered in position. As shown in FIGS. 5 and 6, each embodiment of the tire carcass 82 shown includes end seams 108 located at the crown portion 90. This location of the end seams 108 is desirable because the tire 80 is strongest at the crown portion 90. However, other end seam 108 locations may be used in other embodiments within the scope of the invention.

Figure 7:
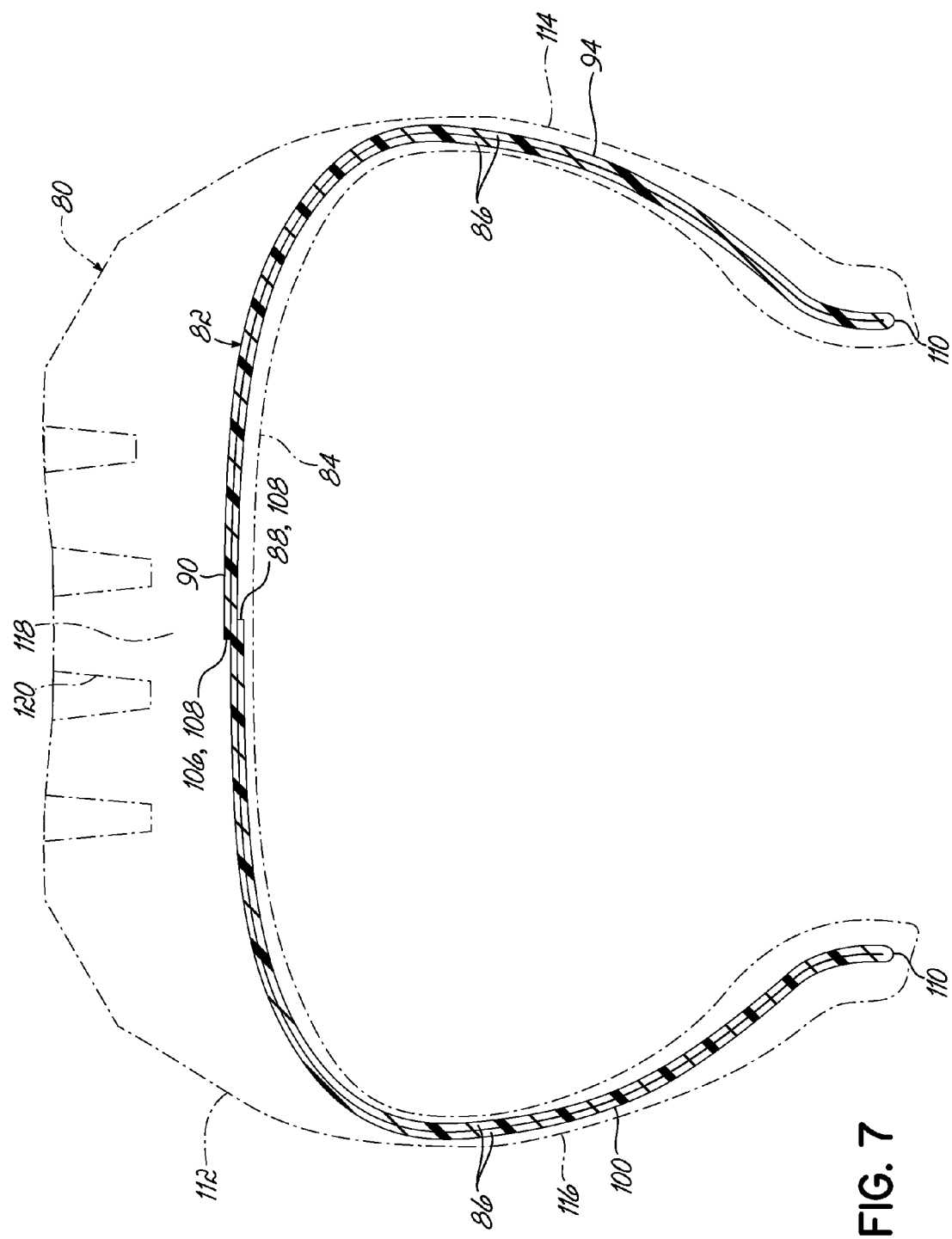
FIG. 7 is a cross-sectional side view of the carcass of a tire formed by the tire making machine of FIG. 1, with additional elements of the tire shown in phantom.
Figure 8:
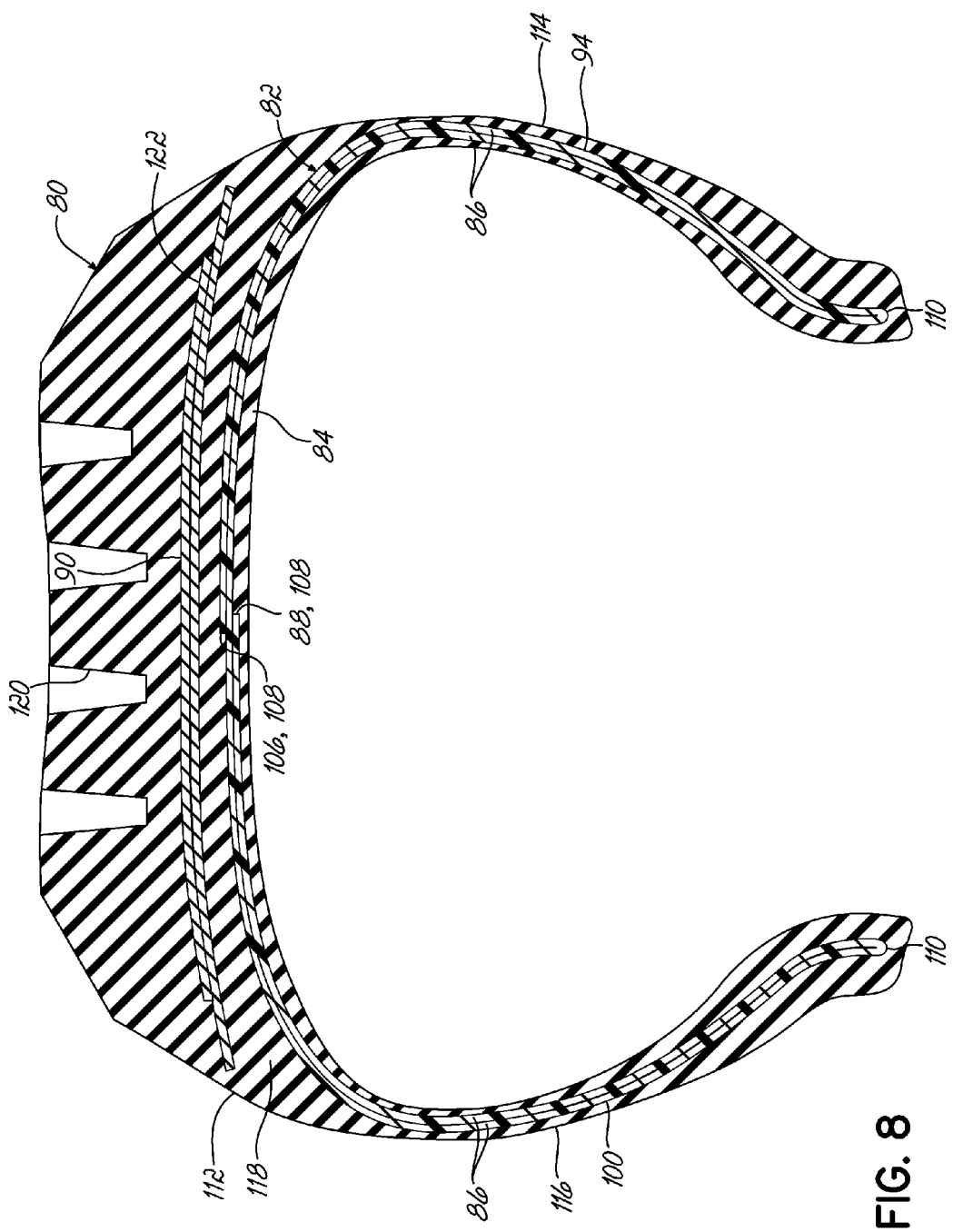
FIG. 8 is a cross-sectional side view of a tire formed by the tire making machine of FIG. 1.

As shown in FIGS. 7 and 8, the remainder of the pneumatic tire 80 may then be assembled onto the carcass 82 and the inner liner 84. As shown most clearly in FIG. 7, the carcass 82 advantageously does not require beads for reinforcement at the free ends 110 of the first sidewall portion 94 and the second sidewall portion 100. As a result, the ply cords 86 are uniformly positioned near these free ends 110 without any void areas that need to be filled around a conventional bead. The carcass 82 is encased by a rubber layer 112 which includes the inner liner 84 previously positioned on the mandrel 28. The rubber layer 112 includes a first tire sidewall 114 encasing the first sidewall portion 94 of the carcass 82, a second tire sidewall 116 encasing the second sidewall portion 100 of the carcass 82, and a tire crown 118 encasing the crown portion 90 of the carcass 82. As known in the tire building field, the tire crown 118 may include a tread 120 for engaging a roadway and one or more belts 122 located between the tread 120 and the crown portion 90 of the carcass 82 for reinforcing the tire 80. The tire 80 may then be cured by conventional curing devices to finish the assembly of the pneumatic geodesic tire 80.

The tire assembly process described above results in a pneumatic tire 80 having a carcass 82 with ply cords 86 following a continuous geodesic path over multiple passes across the mandrel 28. The geodesic path of the ply cords 86 provides numerous benefits for the pneumatic tire 80, including improved strength and durability, as well as a softer ride. Additionally, the plurality of ply cords 86 are braided together into an interlaced structure that provides additional benefits, including better impact resistance of the carcass 82 and efficient load distribution throughout the tire 80. The interlacing of the ply cords 86 produces a plurality of closely-spaced crimped ply cord joints that do not permit crack propagation over a long length or rivet area, which therefore reduces the likelihood of a delamination. Moreover, different ply cord materials may be used in subsets of the ply cords 86 (e.g., some glass fiber ply cords and some carbon fiber ply cords) to hybridize the properties of the tire carcass 82 as required for certain pneumatic tires 80. Each pass of the braiding machine 12 across the mandrel 28 requires less than a minute, which results in a significantly faster production of the geodesic carcass 82 than conventional single-ply cord winding processes currently used in the art. Thus, the geodesic tire 80 with a plurality of braided ply cords 86 saves significant manufacturing costs and time while providing significant structural and durability advantages over conventional tires.

While the present invention has been illustrated by a description of several embodiments, and while such embodiments have been described in considerable detail, there is no intention to restrict, or in any way limit, the scope of the appended claims to such detail. Additional advantages and modifications will readily appear to those skilled in the art. For example, the carcass 82 could alternatively be formed by laying separate passes or layers of braided ply cords 86 onto the mandrel 28 and wrapping those layers around conventional beads rather than the continuous fold-over application process described in connection with FIGS. 4A-4D. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. A pneumatic tire, comprising:
a carcass including a plurality of ply cords braided into an interlaced structure by a braiding machine moving at varying speeds relative to a mandrel as the plurality of ply cords is applied to the mandrel, the plurality of ply cords being separate ply cords loaded onto a plurality of separated carriers on the braiding machine before being braided into the carcass, the carcass including a crown portion, a first sidewall portion having a first free end, and a second sidewall portion having a second free end and connected with the first sidewall portion by the crown portion, each of the ply cords following a geodesic path from the first sidewall portion to the second sidewall portion, and the carcass not including reinforcement structure or beads at the first and second free ends because each of the plurality of separate ply cords is folded over itself at the first and second free ends to provide uniform positioning and support of the plurality of ply cords; and
a rubber layer surrounding the carcass, the rubber layer including a first tire sidewall encasing the first sidewall portion of the carcass, a second tire sidewall encasing the second sidewall portion of the carcass, and a tire crown encasing the crown portion of the carcass, and the tire crown including a tread.

2. A pneumatic tire, comprising:
a carcass including a plurality of ply cords braided into an interlaced structure, the carcass including a crown portion, a first sidewall portion, and a second sidewall portion connected with the first sidewall portion by the crown portion, each of the ply cords following a geodesic path from the first sidewall portion to the second sidewall portion; and
a rubber layer surrounding the carcass, the rubber layer including a first tire sidewall encasing the first sidewall portion of the carcass, a second tire sidewall encasing the second sidewall portion of the carcass, and a tire crown encasing the crown portion of the carcass, and the tire crown including a tread,
wherein the plurality of ply cords defines first ply cord ends located at the crown portion and second ply cord ends located at the crown portion.

3. A pneumatic tire, comprising:
a carcass including a plurality of ply cords braided into an interlaced structure by a braiding machine moving at varying speeds relative to a mandrel as the plurality of ply cords is applied to the mandrel, the carcass including a crown portion, a first sidewall portion, and a second sidewall portion connected with the first sidewall portion by the crown portion, each of the ply cords following a geodesic path from the first sidewall portion to the second sidewall portion; and
a rubber layer surrounding the carcass, the rubber layer including a first tire sidewall encasing the first sidewall portion of the carcass, a second tire sidewall encasing the second sidewall portion of the carcass, and a tire crown encasing the crown portion of the carcass, and the tire crown including a tread,
wherein the plurality of ply cords is braided into a regular (2×2) braid pattern.

4. The pneumatic tire of claim 2, wherein the plurality of ply cords is braided into a diamond (1×1) braid pattern.

5. The pneumatic tire of claim 4, wherein the plurality of ply cords includes at least 144 ply cords braided into the interlaced structure.

6. The pneumatic tire of claim 2, wherein each of the plurality of ply cords defines an angle from a tangential direction that ranges from nearly 0 degrees at the first and second sidewall portions to about 48 degrees at the crown portion.

7. The pneumatic tire of claim 2, wherein each of the plurality of ply cords crimps partially around each other intersecting ply cord in the interlaced structure.

8. The pneumatic tire of claim 2, further comprising:
a belt disposed in the rubber layer at the tire crown between the tread and the crown portion of the carcass.

9. The pneumatic tire of claim 2, wherein the first and second sidewall portions of the carcass include free ends located opposite the crown portion, and the plurality of ply cords is folded over itself at the free ends without wrapping around a bead.

10. A method of forming a pneumatic tire, comprising:
braiding a plurality of ply cords into an interlaced structure using a braiding machine, the braiding comprising:
- moving a mandrel axially relative to the braiding machine;
- while moving the mandrel relative to the braiding machine, applying the braided ply cords onto the mandrel to form a carcass including a crown portion, a first sidewall portion, and a second sidewall portion connected with the first sidewall portion by the crown portion, wherein the braided ply cords include first ply cord ends located at the crown portion and second ply cord ends located at the crown portion; and
- varying a movement speed of the mandrel such that each of the braided ply cords follows a geodesic path from the first sidewall portion to the second sidewall portion; and encasing the carcass with a rubber layer including a first tire sidewall encasing the first sidewall portion of the carcass, a second tire sidewall encasing the second sidewall portion of the carcass, and a tire crown encasing the crown portion of the carcass, the tire crown including a tread.

11. The method of claim 10, wherein applying the braided ply cords onto the mandrel further comprises:
- adhering the first ply cord ends into position at the crown portion; and
- moving the mandrel axially relative to the braiding machine in a first direction so as to form a portion of the crown portion of the carcass and a portion of the first sidewall portion of the carcass.

12. The method of claim 11, wherein the mandrel is movably mounted adjacent to first and second fixtures, and applying the braided ply cords onto the mandrel further comprises:
- changing a direction of axial movement of the mandrel with respect to the braiding machine to a second direction opposite the first direction to thereby fold the plurality of ply cords onto itself at the first sidewall portion;
- moving the first fixture into engagement with the mandrel at the first sidewall portion to clamp the plurality of ply cords into position at the first sidewall portion; and
- moving the mandrel axially relative to the braiding machine in the second direction so as to form a portion of the first sidewall portion, a portion of the crown portion, and a portion of the second sidewall portion of the carcass.

13. The method of claim 12, wherein applying the braided ply cords onto the mandrel further comprises:
- changing a direction of axial movement of the mandrel with respect to the braiding machine to the first direction to thereby fold the plurality of ply cords onto itself at the second sidewall portion;
- moving the second fixture into engagement with the mandrel at the second sidewall portion to clamp the plurality of ply cords into position at the second sidewall portion;
- moving the mandrel axially relative to the braiding machine in the second direction so as to form a portion of the second sidewall portion and a portion of the crown portion of the carcass; and
- adhering the second ply cord ends into position at the crown portion.

14. The method of claim 10, wherein braiding the plurality of ply cords into an interlaced structure further comprises:
- braiding the plurality of ply cords into a regular (2×2) braid pattern.

15. The method of claim 10, wherein braiding the plurality of ply cords into an interlaced structure further comprises:
- braiding the plurality of ply cords into a diamond (1×1) braid pattern.

16. The method of claim 10, wherein the braiding machine includes a track plate having a first inner plate portion, a second outer plate portion surrounding the first inner plate portion, and a plurality of carriers receiving supplies of ply cord material on the track plate, and braiding the plurality of ply cords into an interlaced structure further comprises:
- moving the mandrel with respect to the track plate to pull the plurality of ply cords from the plurality of carriers on the track plate; and
- rotating the first outer plate portion and the second inner plate portion in opposing directions to interlace the plurality of ply cords as the plurality of ply cords travels from the carriers to the mandrel.

17. The method of claim 16, further comprising:
- adjusting a rotational speed of the first outer plate portion and the second inner plate portion independently from an adjustment of an axial relative velocity of the mandrel, thereby modifying an angle of each of the plurality of ply cords from a tangential direction.

18. The method of claim 17, further comprising:
- modifying the angle from the tangential direction of each of the plurality of ply cords from nearly 0 degrees at the first and second sidewall portions to about 48 degrees at the crown portion.

19. The method of claim 16, wherein braiding the plurality of ply cords into an interlaced structure further comprises:
- tensioning the plurality of ply cords such that each of the plurality of ply cords crimps partially around each other intersecting ply cord in the interlaced structure.

20. The method of claim 10, further comprising:
- positioning a belt adjacent the crown portion of the carcass, wherein the carcass and the belt are encased with the rubber layer.

* * * * *